US009827698B2

(12) United States Patent
Tabata

(10) Patent No.: US 9,827,698 B2
(45) Date of Patent: Nov. 28, 2017

(54) PROCESS FOR FORMING A FOAM PRODUCT INTEGRAL WITH SURFACE COVER ELEMENT

(71) Applicant: TACHI-S CO., LTD., Tokyo (JP)

(72) Inventor: Tsuyoshi Tabata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 256 days.

(21) Appl. No.: 14/436,238

(22) PCT Filed: Dec. 2, 2013

(86) PCT No.: PCT/JP2013/082315
§ 371 (c)(1),
(2) Date: Apr. 16, 2015

(87) PCT Pub. No.: WO2014/087953
PCT Pub. Date: Jun. 12, 2014

(65) Prior Publication Data
US 2015/0298371 A1    Oct. 22, 2015

(30) Foreign Application Priority Data

Dec. 3, 2012   (JP) .................................. 2012-264375

(51) Int. Cl.
*B29C 39/00* (2006.01)
*B29C 44/18* (2006.01)
(Continued)

(52) U.S. Cl.
CPC .............. *B29C 44/18* (2013.01); *B29C 44/04* (2013.01); *C08J 9/122* (2013.01); *C08J 9/34* (2013.01);
(Continued)

(58) Field of Classification Search
CPC ................................ B29C 44/04; B29C 44/18
(Continued)

(56) References Cited

U.S. PATENT DOCUMENTS 4,316,875 A * 2/1982 Barth .................... B29B 7/7433
261/DIG. 26
4,337,318 A * 6/1982 Doyle ........................ C08J 9/12
521/80
(Continued)

FOREIGN PATENT DOCUMENTS

CN          1772786 A        5/2006
JP        61217218 A *       9/1986
(Continued)

OTHER PUBLICATIONS

Air Products, Safetygram18, Carbon Dioxide, http://www.airproducts.com/~/media/files/pdf/company/safetygram-18.pdf, 2014.*
(Continued)

*Primary Examiner* — Timothy Kennedy
(74) *Attorney, Agent, or Firm* — Birch, Stewart, Kolasch & Birch, LLP

(57) ABSTRACT

A process is provided for forming a foam product integral with a cover surface, which restricts emission of the carbon oxide during the step of preparing a carbon-oxide-mixed liquid by mixing carbon oxide into a first material containing polyol as a primary ingredient; under a pressure applied thereto. The process includes a first step wherein a carbon-oxide-mixed liquid material is prepared by mixing carbon oxide C into a first material containing polyol as a primary ingredient, under a pressure applied thereto, without effecting a forced stirring during said first step; a second step wherein said carbon-oxide-mixed liquid material and a second material containing isocyanate as a primary ingredient are impinged on and mixed with each other in a high-pressure foaming agent preparation device, thereby providing a resultant urethane material as a liquid urethane foaming agent; and a third step wherein said liquid urethane
(Continued)

foaming agent produced at said second step is introduced toward an inside of a surface cover element under a pressure applied thereto.

6 Claims, 3 Drawing Sheets

(51) Int. Cl.
  *B29C 44/04* (2006.01)
  *C08J 9/12* (2006.01)
  *C08J 9/34* (2006.01)
  *B29K 75/00* (2006.01)
  *B29K 105/04* (2006.01)
  *B29L 9/00* (2006.01)

(52) U.S. Cl.
  CPC ...... *B29K 2075/00* (2013.01); *B29K 2105/04* (2013.01); *B29L 2009/00* (2013.01); *C08J 2201/022* (2013.01); *C08J 2203/06* (2013.01); *C08J 2375/08* (2013.01)

(58) Field of Classification Search
  USPC ....................................................... 264/46.6
  See application file for complete search history.

(56) References Cited

U.S. PATENT DOCUMENTS

| | | | | |
|---|---|---|---|---|
| 5,360,831 A | * | 11/1994 | Lidy | ................... B29C 44/1261 |
| | | | | 427/373 |
| 6,544,481 B1 | * | 4/2003 | Sulzbach | .............. B29C 44/461 |
| | | | | 422/133 |

FOREIGN PATENT DOCUMENTS

| | | |
|---|---|---|
| JP | 10-58462 A | 3/1998 |
| JP | 11-293027 A | 10/1999 |
| JP | 2002-20444 A | 1/2002 |
| JP | 2003-206327 A | 7/2003 |
| JP | 2003-334828 A | 11/2003 |
| JP | 2005-312548 A | 11/2005 |
| JP | 2006-206793 A | 8/2006 |
| JP | 2011-31410 A | 2/2011 |

OTHER PUBLICATIONS

Office Action dated Apr. 5, 2016 in related Chinese Aplication No. 201380060765.8 with an English Translation.
Notice of Reasons for Rejection dated Jun. 14, 2016 in related JP Application No. 2012-264375 with an English Translation.

* cited by examiner

[FIG. 1]
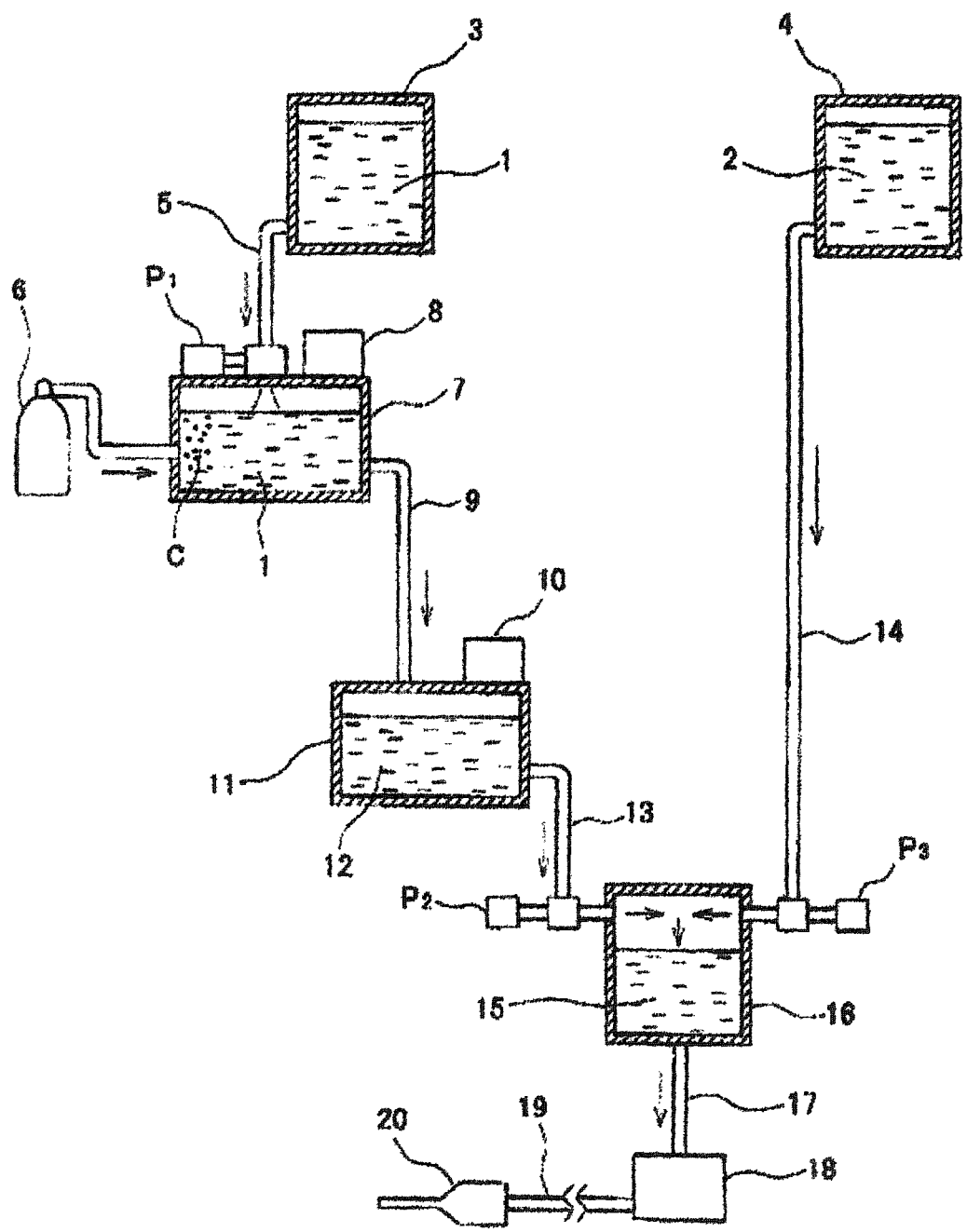

[FIG. 2]
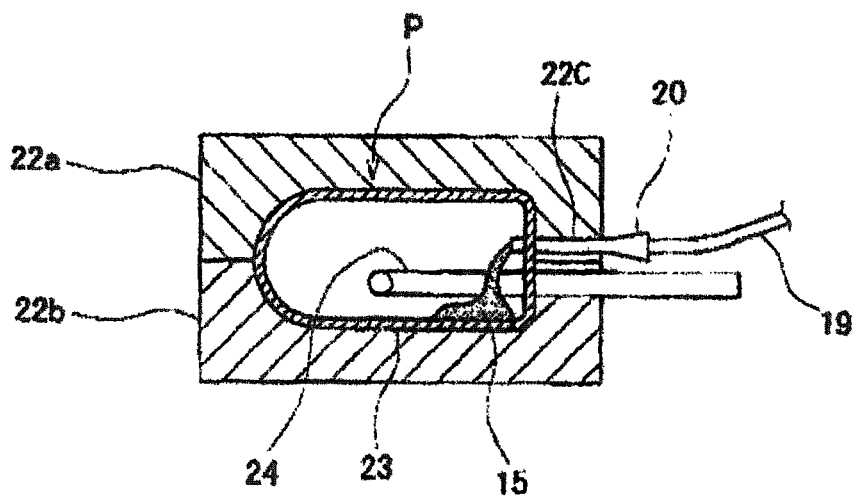

[FIG. 3]
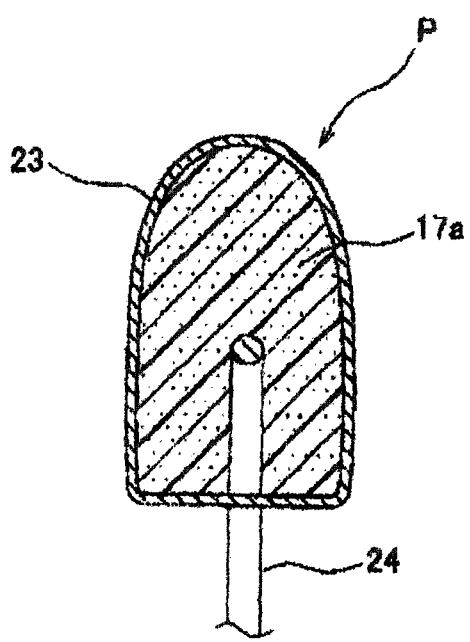

PROCESS FOR FORMING A FOAM PRODUCT INTEGRAL WITH SURFACE COVER ELEMENT

TECHNICAL FIELD

The present invention relates to a process for forming a foam product integral with surface cover element and is particularly directed to this kind of foaming process to form a foam product adapted for industrial use in vehicles or automobiles, such as a headrest or an armrest.

BACKGROUND ART

As hitherto known, formation of a low-density foam product or low-density polyurethane foam to produce a certain article adapted for use in an automobile has been effected, using a combination of water and chlorofluorocabons as an effervescing agent during the foaming steps. But, such foaming process employing the combination of water and chlorofluorocarbons as an effervescing agent will result in destruction of the ozonosphere, which raises an environmental problem.

Therefore, avoiding use of chlorofulorocarbons is required. An example of technical solution thereto is taught in the Laid-Open Patent Publication No. Hei 11-293027 which describes a process for forming a polyurethane foam integrally together with a surface cover element, without use of chlorofluorocarbons, to produce a foam product integral with surface cover element, such as a headrest or an armrest.

Devices used in this prior-art process include the following three storage containers: a first storage container in which a first liquid material required for production of a given polyurethane resin is stored, the first liquid material containing a polyisocyanate as a primary ingredient; a second storage container in which a second liquid material required for production of the aforesaid polyurethane resin is stored, the second liquid material containing a polyol as a primary ingredient; and a third storage container in which stored is an additional liquid material containing a polyol as a primary ingredient, an organometallic catalyst, an effervescing agent and other required additives, such that a percentage of content of all those ingredients and additives is made equal to a percentage of content of the second liquid material (without addition of tertiary amine catalyst therein), wherein a supply tube is provided for flow communication with the third storage container to permit supply of those ingredients and additives into that container. Further, this third storage container is equipped with a $CO_2$ gas loading device, so that the aforesaid ingredients and additives stored in the third storage container may be mixed with carbon oxide to the extent that the carbon oxide becomes saturated therein.

The first, second and third liquid materials respectively stored in the first, second and third storage containers are supplied at their respective predetermined ratio of flow and via their respective supply tubes into a mixing chamber called "mixing head", after which, all those three liquid materials are jet discharged by a force of high pressure into the mixing chamber and are subjected to instantaneous stirring and mixing with one another. Then, the mixture is discharged from a discharge opening formed in an end of that mixing head to the outside (e.g. to an inside of a molding or die). After then, the three liquid materials in the discharged mixture start to react on each other for polymerization (i.e. polymerizing reaction), while being foamed. Accordingly, a desired shape of polyurethane foam can be obtained from the thus-mixed materials.

PRIOR-ART LITERATURE

Patent-Related Document

Patent-related Document 1: Japanese Laid-Open Patent Publication No. Hei 11-293027

SUMMARY OF THE INVENTION

Problems to be Solved by the Present Invention

However, according to the above-described process for forming a polyurethane foam, the liquid materials in the third storage container are stirred and mixed to the extent that the carbon oxide becomes saturated in the materials within that third storage container. This requires provision of a gas release valve to the third storage container in order to release the carbon oxide from the thus-mixed materials.

It is a purpose of the present invention to provide an improved process for producing a foam product integral with surface cover element, which restricts emission of carbon oxide at the steps of preparing a carbon-oxide-mixed liquid material by mixing carbon oxide into a first material under a pressure applied thereto.

Means For Solving the Problem

In accordance with the present, there is provided a process for forming a foam product integral with surface cover element, which is characterized by comprising:

a first step wherein a carbon-oxide-mixed liquid material is prepared by mixing carbon oxide into a first material which contains polyol as a primary ingredient, under a pressure applied thereto, without effecting a forced stirring during said first step;

a second step wherein said carbon-oxide-mixed liquid material and a second material containing isocyanate as a primary ingredient are impinged on and mixed with each other in a high-pressure foaming agent preparation device, thereby providing a resultant urethane material as a liquid urethane foaming agent; and a third step wherein said liquid urethan foaming agent produced at said second step is introduced toward an inside of a surface cover element under a pressure applied thereto, wherein said surface cover element is one element required for forming said foam product integral with surface cover element.

By the virtue of the above-described process for forming a foam product integral with surface cover element, the carbon oxide is mixed into the first material containing polyol as a primary gradient under a pressure applied thereto, thus eliminating the necessity of any forced stirring at that step of preparing the carbon-oxide-mixed liquid material, which restricts emission of the carbon oxide in the air. Accordingly, there is no need for discharging the carbon oxide in the air.

Additionally, the carbon-oxide-mixed liquid material and the second material containing isocyanate as a primary ingredient are impinged on and mixed with each other in the highly-pressurized foaming-agent-preparation device, thereby providing a resultant urethan material as a liquid urethan foaming agent. Subsequently, such liquid urethan foaming agent is introduced toward an inside of a surface cover element under a pressure applied thereto, wherein such surface cover element has been formed by sewing base materials with one another.

Effects of the Invention

In accordance with the present invention, therefore, it is possible to restrict emission of the carbon oxide during the step of preparing the carbon-oxide-mixed liquid by mixing the carbon oxide into the first material containing polyol as a primary ingredient.

BRIEF DESCRIPTION OF THE DRAWINGS

FIG. 1: A diagram showing one exemplary mode of device and system applied to a process for forming a foam product integral with surface cover element in accordance with the present invention.

FIG. 2: A diagram for showing how the foam product integral with surface cover element is formed by the device shown in the FIG. 1.

FIG. 3: A diagram illustrative of a resulting product formed by a device shown in the FIG. 2.

MODE FOR CARRYING OUT THE INVENTION

Hereinafter, with reference to the annexed drawings, a detailed description will be made of a process for forming a foam product integral with surface cover element, by way of one preferred exemplary mode, in accordance with the present invention.

In FIG. 1, there is schematically shown a process for forming a foam product integral with surface cover element (this kind of foam product refers to a foam product adapted for industrial use in a vehicle, such as a headrest or an armrest), according to which, a first material 1 (liquid) containing polyol as a primary ingredient is used, and also a second material 2 (liquid) containing isocyanate as a primary ingredient is used. The first material 1 is stored in a storage container 3, whereas the second material 2 is stored in a storage container 4.

Now, the first material 1 will be described. Preparation of the first material 1 is such that, for example, polypropylene glucose is provided as a polyol which is a primary ingredient of the first material, and then, admixed with such polypropylene glucose are: an effervescing agent, a cross-linking agent, a catalyst, a flame retardant and other required additives, at a proper ratio of content. By way of one example, the mixing ratio of those elements to 100 wt % of the polyol may be as follows: 2 to 3 wt % of the effervescing agent, 2 to 3 wt % of the cross-linking agent, 1 to 4 wt % of the catalyst, and 1 to 2 wt % of the flame retardant.

On the other hand, with regard to the second material 2, an isocyanate to be used as a primary ingredient in that second material may include: polyethylene polyphenyl polyisocyanate; or methylene bisdiisocyanate, for example. In this instance, the second material may be prepared properly in the presence of 100 wt % of such sort of isocyanate.

The first material 1 stored in the storage container 3 is supplied via a fluid conduit 5 into an inside of a mixing device 7. The fluid conduit 5 leads to a pump P1 provided on the mixing device 7 and the pump P1 is operable to adjust an amount of supply of the first material 1 into the mixing device 6.

Carbon oxide C is supplied from a carbon oxide gas cylinder 6 to the mixing device 7 so that the carbon oxide is injected into the first material 1 stored in that mixing device. As stated above, the first material 1 is a liquid substance, and therefore, forced injection of the carbon oxide C into such liquid first material 1 naturally results in solution and presence of the carbon oxide C in the latter 1. Concurrent therewith, a pressure device 8 is actuated to pressurize the inside of the mixing device to a degree that the thus-injected carbon oxide 5 is held in solution in the first material 1, which eliminates the necessity of forced stirring of the carbon oxide in the first material.

With this pressurization in the mixing device 7, the carbon oxide C is maintained in solution in the liquid first material 1 and therefore prevented from being emitted from that liquid first material.

More specifically, at this stage, upon injection of the carbon oxide C into the liquid first material 1, a pressure of 3 to 10 Map is simultaneously applied thereto by the pressure device 8, so that the carbon oxide C is mixed into the first material 1 and held in solution therein.

Then, the first material 1 with the carbon oxide C present therein is supplied via a fluid conduit 9 into an inside of a storage container 11, wherein the fluid conduit 9 is connected between the mixing device 7 and the storage container 11 to permit flow communication therebetween. In the storage container 11, under a pressure adjustingly applied by a pressure device 10, a percentage of content of the carbon oxide C in the first material is so controlled as to be in the order of 0.2 to 2%, whereupon it is now to be understood that a carbon-oxide-mixed liquid material 12 with the thus-controlled carbon oxide content is stored in the storage container 11.

Next, such carbon-oxide-mixed liquid material 12 is supplied via a fluid conduit 13 to a pump P2, wherein the fluid tube 13 is connected between the storage container 11 and a high-pressure foaming agent preparation device 16 to permit flow communication therebetween. At this point, the liquid material 12 is adjusted as to its flow rate by the pump P2 and simultaneously introduced thereby into the high-pressure foaming agent preparation device 16. On the other hand, the second material 2 in the storage container 4 is supplied via a fluid conduit 14 to a pump P3, wherein the fluid conduit 14 is connected between the storage container 4 and the aforesaid high-pressure foaming agent preparation device 16 to permit flow communication therebetween. At this point, the second material 2 is adjusted as its flow rate by the pump P3 and simultaneously introduced thereby into the high-pressure foaming agent preparation device 16. Then, the carbon-oxide-mixed liquid material 12 and the second material 2 are forcibly impinged upon and mixed with each other within the high-pressure foaming agent preparation device 16, so that a liquid urethane foaming agent 13 is produced therein.

In other words, the carbon-oxide-mixed liquid material 12 and the second material 2 are forcibly mixed with and reacted on each other under a high pressure in the high-pressure foaming agent preparation device 16, thereby producing a liquid urethane foaming agent 15 with the carbon oxide contained therein, within that high-pressure foaming agent preparation device.

Subsequently, the resulting liquid urethane foaming agent 15 is supplied from the high-pressure foaming agent preparation device 16, via a fluid conduit 17, to an injection device 18, wherein the fluid conduit 17 is connected between the high-pressure foaming agent preparation device 16 and the injection device 18 to permit flow communication therebetween.

Hereinafter, a description will be made of one exemplary mode wherein the aforesaid liquid urethane foaming agent is used to form a headrest P for use with an automotive seat, the headrest P being shown in FIG. 3.

As shown in FIG. 2, the liquid urethane foaming agent 15, which has been supplied to the injection device 18 as stated above, is now supplied via a fluid conduit 19 to an injection nozzle 20. From that injection nozzle 20, the liquid urethane foaming agent 15 is injected into an inside of a surface cover element 23 (formed by sewing base materials together in the illustrated shape) placed in a foaming die device 22, during which a pressure is applied thereto. Namely, at this stage, a predetermined degree of pressure is applied to an inside of the foaming die device 22, and under such pressurized state, the liquid urethane foaming agent 15 is injected from the injection nozzle into the inside of the surface cover element 23.

Note that the foaming die device 22 comprises an upper die 22a and a lower die 22b, and the foaming die device is formed with an injection nozzle insertion hole 22c which allows the aforesaid injection nozzle 20 to be inserted therein. Also, note that a headrest stay 24 is placed in the inside of the surface cover element 23 set in this foaming die device 22.

Accordingly, through the above-described steps, the headrest P shown in FIG. 3 is formed. The resultant headrest P includes: a foam padding 17a which is a soft polyurethane foam formed from the urethane foaming agent 15 in the aforesaid foaming die device; the surface cover element 23 covering the foam padding 17a; and the headrest stay 24 provided within the foam padding 17a.

At the above-described foaming steps, it is to be noted that the liquid urethane foaming agent 15 injected into the surface cover element is immediately exposed to the air having atmospheric pressure, the high pressure applied to that urethane foaming agent is suddenly decreased, with the result that the carbon oxide C present in the liquid urethane foaming agent immediately becomes equal in pressure degree to the air, at which moment, the carbon oxide C is instantly vaporized (or expanded) into a mass of small bubbles in the liquid urethan foaming agent. This bubbly expansion of the carbon oxide multiplies a foaming rate of the urethane foaming agent 15 which is being concurrently cured and foamed at this stage, whereby it is easy to achieve a desired low density of a resulting polyurethane foam product of soft property in the surface cover element. In this regard, the surface cover element may be formed as shown by sewing base materials together, for instance.

It is noted here that the carbon oxide C used is a carbon oxide to be emitted in the air during the process of obtaining petroleum and byproducts from a naphtha. In the present invention, such carbon oxide is collected during that naphtha processing steps and stored in a cylinder for use in the above-described foaming process. Therefore there is no need to provide any particular industrial process for producing carbon oxide. In other words, the carbon oxide C used in the illustrated mode of the present invention is a carbon oxide generated during the steps of extracting and refining a petroleum from a naphtha, and the carbon oxide is directly collected at such steps, which therefore do not require any industrial process for production of the carbon oxide C. Further, this carbon oxide collection way prevents emission of the carbon oxide C in the air. Thus, it is possible to reduce costs involved and also set up an eco-friendly industrial system and facility.

In this context, water may be used for chemical reaction with the liquid foaming agent, instead of using the carbon oxide and chlorofluorocarbons, in order to form the intended soft polyurethane foam product. But, this foaming method, using water only, requires several seconds of creaming time during which the liquid foaming agent still remains in liquid, like a cream, before it is cured and foamed into a soft polyurethane foam product within the surface cover element.

In contrast to the foregoing water reaction method, the illustrated mode of the present invention, using the carbon oxide, can extremely reduce the aforesaid creaming time close to zero, thereby extremely shortening a time during which the liquid urethan foaming agent 15 will remain in liquid. Accordingly, the liquid urethan foaming agent 15, upon being injected into the inside of the surface cover element, becomes instantly cured and foamed therein, which substantially precludes leakage of the urethan foaming agent 15 through sewn portions of the surface cover element (such sewn portions including: pinholes in the seam; and mutually-contacted, unsewn regions of base materials along each of the sewn portions).

Note that the "creaming time" stated above is generally defined to be a reaction time during which one liquid material A (i.e. the carbon-oxide-mixed liquid material 12 containing carbon oxide) and another liquid material B (i.e. the second liquid material 2) react on each other and begin to assume a whitish, pasty state, like a cream, which does not develop into a foamed state, this creaming phenomenon occurring shortly after those two liquid materials A and B have been mixed with each other.

More specifically, according to the illustrative mode of the present invention, the first liquid material 1 containing the carbon oxide C and the second liquid material 2 are reacted on each other within the highly-pressure foaming agent preparation device 16 as described previously, whereupon the thus-reacted materials begin to take on a somewhat bubbly appearance and therefore become a liquid foaming agent 15 that looks like a cream. At this stage, since a predetermined high pressure is given in this device 16, a foaming rate of such liquid foaming agent 15 is controlled and suppressed to a certain low degree, thereby preventing the liquid foaming agent 15 from being foamed into a bubbly white state. Under so controlled conditions, the liquid foaming agent 15 is supplied by the injection device 18 to the injection nozzle 20 through which the liquid foaming agent is injected into the inside of the surface cover element 23. At this injection step, the liquid foaming agent 15 is immediately exposed to the air having atmospheric pressure, while being injected into the surface cover element. Thus, upon entering the inside of the surface cover element, the liquid foaming agent is instantly foamed in a greatly accelerated way. This is because the carbon oxide is contained in the liquid foaming agent under a high pressure in the illustrative mode of the invention, and therefore, upon being exposed to the air under atmospheric pressure, the liquid foaming agent is instantly cured and foamed, with concurrent expansion and emission of the carbon oxide, which means that the creaming time of the liquid foaming agent is extremely short. In other words, the liquid sate of the foaming agent 15 is shortened extremely. Therefore, it is possible to substantially prevent leakage of the liquid foaming agent 15 through sewn portions of the surface cover element (such sewn portions including: pinholes in the seam; and mutually-contacted, unsewn regions of base materials along each of the sewn portions). Subsequent thereto, as indicated in FIG. 3, a low-density foam padding 17a is formed and filled in the surface cover element 3, form which it is to be understood that a soft foam product integral with cover surface element is now produced, in a generic sense, and that one exemplary mode of such soft foam product integral with cover surface element may be the headrest P illustrated in the FIG. 3.

DESCRIPTION OF THE REFERENCE NUMERALS 1 first liquid material
2 second liquid material
3, 4 and 11 storage containers
C carbon oxide
7 mixing device
12 carbon-oxide-mixed liquid material
16 high-pressure foaming agent preparation device
15 urethane foaming agent
20 injection nozzle

The invention claimed is:

1. A process for forming a foam product integral with surface cover element to be used for headrest and/or armrest of an industrial product for vehicle installation, which is characterized by comprising:
   a first step wherein a first material 1 comprising a polyol as a primary ingredient is stored in a first retention tank 3;
   a second step wherein a second material comprising an isocyanate as a primary ingredient is stored in a second retention tank 4;
   a third step wherein the first material 1 in the first retention tank 3 is transferred through regulation to a mixer 7;
   a fourth step wherein a carbon dioxide C from a carbon dioxide cylinder 6 is supplied to the first material in the mixer 7 to give a liquid state which contains the carbon dioxide C dissolved with the first material 1 and without forced stirring using pressure by using device 8;
   a fifth step wherein the first material 1 dissolved with the carbon dioxide C is supplied to a third retention tank 11 to control a dissolving amount of the carbon dioxide C through a pressure device 10 to store a carbon dioxide dissolved liquid 12;
   an sixth step wherein the carbon dioxide dissolved liquid 12 in the third retention tank 11 is supplied to a high pressure foaming machine 16;
   a seventh step wherein the second material 2 in a second retention tank 4 is supplied to the high pressure foaming machine 16, and the carbon dioxide dissolved liquid 12 and the second material 2 are mixed in the high pressure foaming machine to form an urethane foaming reagent 15; and
   an eighth step wherein an urethane foaming reagent 15 is supplied from the high pressure foaming machine 16 to an injection device 18.

2. The process for forming the foam product integral with surface cover element to be used for the headrest and/or the armrest of the industrial product for vehicle installation, which is characterized by comprising as described in claim 1, wherein the dissolved amount of carbon dioxide in the carbon dioxide dissolved liquid 12 is a controlled as to be 0.2 to 2%.

3. The process for forming the foam product integral with surface cover element to be used for the headrest and/or the armrest of the industrial product for vehicle installation, which is characterized by comprising as described in claim 1 or claim 2, wherein a carbon dioxide is dissolved in a first material 1 under the pressure of 3-10 M Pa.

4. The process for forming the foam product integral with the surface cover element to be used for the headrest and/or the armrest of the industrial product for vehicle installation, which is characterized by comprising as described in claim 1, wherein said carbon dioxide is emitted during a process for refining a petroleum, and wherein said particular carbon dioxide is mixed into said first material at said first step.

5. The process for forming a foam product integral with a surface cover element to be used for the headrest and/or the armrest of the industrial product for vehicle installation, which is characterized by comprising as described in claim 1, wherein said surface cover element is the surface cover element of a headrest or an armrest.

6. The process for forming a foam product integral with a surface cover element to be used for the headrest and/or the armrest of the industrial product for vehicle installation, which is characterized by comprising as described in claim 5, wherein said surface cover element is suitable for use in a vehicle or an automobile.

* * * * *